United States Patent
Schwarz

(10) Patent No.: US 8,215,616 B2
(45) Date of Patent: Jul. 10, 2012

(54) METHOD FOR OPERATING A MERCHANDISE PRESENTATION ARRANGEMENT, AS WELL AS A LIFTING DEVICE FOR A MERCHANDISE PRESENTATION ARRANGEMENT IN ORDER TO CARRY OUT SAID METHOD

(75) Inventor: Stefan Schwarz, Altdorf (DE)

(73) Assignee: Festo AG & Co. KG, Esslingen (DE)

( * ) Notice: Subject to any disclaimer, the term of this patent is extended or adjusted under 35 U.S.C. 154(b) by 789 days.

(21) Appl. No.: 12/313,828

(22) Filed: Nov. 25, 2008

(65) Prior Publication Data

US 2009/0140222 A1 Jun. 4, 2009

(30) Foreign Application Priority Data

Nov. 29, 2007 (DE) .......................... 10 2007 057 481

(51) Int. Cl.
*A61G 7/10* (2006.01)
(52) U.S. Cl. ................................ 254/93 HP; 254/89 H
(58) Field of Classification Search ............. 254/93 HP, 254/2 B, 93 L, 89 H
See application file for complete search history.

(56) References Cited

U.S. PATENT DOCUMENTS

| | | | | |
|---|---|---|---|---|
| 4,275,869 A | * | 6/1981 | Clements | 254/89 H |
| 4,688,760 A | * | 8/1987 | Garman et al. | 254/93 HP |
| 4,786,032 A | * | 11/1988 | Garman et al. | 254/93 HP |
| 5,506,012 A | * | 4/1996 | Wright et al. | 428/35.2 |
| 5,669,086 A | * | 9/1997 | Garman | 5/86.1 |
| 6,199,827 B1 | * | 3/2001 | Rimington et al. | 254/93 HP |
| 6,317,909 B1 | * | 11/2001 | Blum | 5/654 |
| 6,929,249 B1 | * | 8/2005 | Kim | 254/93 HP |
| 2008/0011989 A1 | * | 1/2008 | Davis | 254/93 HP |

FOREIGN PATENT DOCUMENTS

| | | |
|---|---|---|
| DE | 3703593 | 10/1987 |
| DE | GB2195399 | * 4/1988 |
| DE | 19948940 | 4/2000 |
| DE | 102004048428 | 4/2006 |
| DE | 202007011680 | 11/2007 |
| DE | 602004006822 | 5/2008 |
| EP | 1285867 | 2/2003 |
| WO | WO8810232 | * 11/1988 |

* cited by examiner

Primary Examiner — Lee D Wilson
(74) Attorney, Agent, or Firm — Hoffmann & Baron, LLP

(57) ABSTRACT

A merchandise presentation arrangement (11) contains a lifting bottom (33) carried by lifting cushions (32) that are arranged on top of one another and can be expanded up to a functional height by supplying compressed fluid. Each lifting cushion (32) is assigned a control valve and a pressure sensor that are connected to a control unit. In an automatic program sequence, compressed fluid is supplied to a lifting cushion (32) until a reference pressure value corresponding to the total weight of the merchandise is reached, wherein a switching pressure value is calculated from said reference pressure value for each lifting cushion (32).

11 Claims, 6 Drawing Sheets

METHOD FOR OPERATING A MERCHANDISE PRESENTATION ARRANGEMENT, AS WELL AS A LIFTING DEVICE FOR A MERCHANDISE PRESENTATION ARRANGEMENT IN ORDER TO CARRY OUT SAID METHOD

BACKGROUND OF THE INVENTION

The invention pertains to a method for operating a merchandise presentation arrangement that features a lifting device with a lifting bottom for depositing merchandise in stack layers that are arranged on top of one another, as well as a lifting cushion arrangement that carries the lifting bottom and comprises one or more lifting cushions that are arranged on top of one another and can be individually filled with a compressed fluid, particularly compressed air, wherein the lifting cushions can be expanded up to a functional height limited by a lift limiting device by supplying compressed fluid and used in succession if several lifting cushions are provided, wherein each lifting cushion is assigned a separate control valve that controls the supply of compressed fluid to the respective lifting cushion, as well as a separate pressure sensor that measures the fluid pressure in the respective lifting cushion, and wherein a control unit is provided that is connected to the at least one pressure sensor and switches the control valves.

A merchandise presentation arrangement with the aforementioned characteristics is described in DE 20 2007 011 680 U1. This merchandise presentation arrangement makes it possible to respectively raise the lifting bottom in succession by the functional height of one lifting cushion such that the merchandise situated in the respective top stack layer can be easily removed. The expansion of the individual lifting cushions is respectively initiated by an operator.

Furthermore, DE 10 2004 048 428 A1 discloses a container with a lifting bottom that is raised by means of a lifting cushion arrangement. In this case, the lifting cushion arrangement consists of a single lifting cushion that is acted upon with compressed air by means of a pump with an assigned switching device. The switching device can be selectively actuated manually or by a sensor that measures the filling level in the container.

EP 1 285 867 A2 describes a container with a lifting bottom that can be raised by means of a scissor jack arrangement with assigned drive. In this case, a sensor device that measures the filling level in the container and is realized in the form of, for example, a light barrier or a capacitive or inductive sensor device is provided in order to control the drive and therefore to readjust the lifting bottom. The filling weight of the merchandise could also be determined as a command variable for the readjustment of the lifting bottom in this case.

In addition, DE 199 48 940 A1 discloses a container with a lifting bottom that rests on springs distributed over its surface, wherein these springs raise the lifting bottom when the load acting thereupon is relieved.

Based on the merchandise presentation arrangement according to DE 20 2007 011 680 U1, the present invention aims to develop a method of the initially cited type that is carried out automatically after an initial activation such that the individual lifting cushions are automatically expanded in succession, and the lifting bottom is incrementally raised without any initiation by an operator once the stack height has decreased by a certain amount.

SUMMARY OF THE INVENTION

According to the invention, this objective is attained in that, after depositing the merchandise and activating the lifting device, compressed fluid is supplied to a lifting cushion or one of the lifting cushions in an automatic program sequence until the fluid pressure increases to a reference pressure value $p_{Ref}$ that essentially corresponds to the total weight of the merchandise and the lifting cushion begins to expand with an essentially constant reference pressure value, whereupon the supply of compressed fluid is interrupted, in that the control unit recalculates the reference pressure value for each lifting cushion into a switching pressure value $p_{Schalt}$ that is assigned to the respective pressure sensor in accordance with the formula $$P_{Schalt}(n) = \frac{N-n+1}{N+1} \cdot P_{Ref}$$

in which N is the total number of lifting cushions and n is the number assigned to the respective lifting cushion in the sequence in which the lifting cushions are used, in that the supply of compressed fluid to the respective lifting cushion is released when the fluid pressure in the one lifting cushion or the first of several lifting cushions falls below the switching pressure value assigned to the lifting cushion due to the removal of merchandise such that the lifting cushion expands up to its functional height, whereupon the increase in the fluid pressure in the lifting cushion is used as a switching signal for interrupting the supply of compressed fluid to the one lifting cushion or the first of several lifting cushions, and in that, if several lifting cushions are provided, the supply of compressed fluid to the respective next lifting cushion is released simultaneously, or in a time-delayed fashion, referred to the interruption of the supply of compressed fluid to a lifting cushion that was expanded up to its functional height, wherein the supply of compressed fluid to the next lifting cushion is interrupted after at least its switching pressure value is reached and subsequently released again in order to expand the lifting cushion up to its functional height, namely once the fluid pressure falls below the switching pressure value due to the removal of merchandise.

When the at least one lifting cushion is acted upon with compressed fluid, the fluid pressure in the lifting cushion initially increases relatively fast until an upwardly directed force equal to the total weight of the merchandise is exerted upon the lifting bottom. The constant pressure value occurring in the pressure/time curve therefore is a value that corresponds to the total weight of the merchandise and is used as reference pressure value for calculating the switching pressures at which the expansion of the individual lifting cushions to their functional height should take place.

Once the first stack layer has been removed, the remaining stack of merchandise has a correspondingly reduced weight such that not the original total weight, but rather only a correspondingly reduced weight needs to be raised after the first stack layer has been removed. Consequently, the expansion of the respective lifting cushion to its functional height does not take place at the initially measured reference pressure value, but rather at a switching pressure that, so to say, corresponds to the remaining merchandise weight and needs to be calculated in accordance with the aforementioned formula.

In the inventive method, a pressure cushion is always automatically expanded when a stack layer has been removed. The respective top merchandise therefore is practically always arranged at the same height.

The inventive method has a simple sequence that is not susceptible to malfunctions. It furthermore requires essentially no additional hardware such that it can also be cost-efficiently realized.

The present invention not only pertains to the above-described method, but also to a lifting device for carrying out the method.

If it is expected that leaks will occur, it is advantageously proposed to release the supply of compressed fluid in a cyclic fashion when the fluid pressure reaches a lower pressure threshold below the switching pressure value in order to compensate leaks that cause the fluid pressure in the respective lifting cushion to drop below its switching pressure value, wherein the supply of compressed fluid is interrupted when the fluid pressure increases to an upper pressure threshold that lies near the switching pressure value.

According to another useful measure, it is proposed that, after expanding a lifting cushion to its functional height, the fluid pressure in the previously expanded lifting cushion or the previously expanded lifting cushions be lowered or reduced via leaks, namely to the fluid pressure in the last lifting cushion expanded. In this case, it is unnecessary to maintain a higher pressure in the previously expanded lifting cushion or the previously expended lifting cushions. Consequently, significant cost savings can be achieved in the above-described fashion.

It is furthermore advantageous to use the lifting cushions sequentially from the top to the bottom such that the top lifting cushion situated adjacent to the lifting bottom is used as the first lifting cushion, the lifting cushion situated below the top lifting cushion is used as the second lifting cushion, etc.

BRIEF DESCRIPTION OF THE DRAWINGS

One embodiment of the invention is described below with reference to the drawings. In these drawings.

DETAILED DESCRIPTION OF THE PREFERRED EMBODIMENTS

Figure 1:
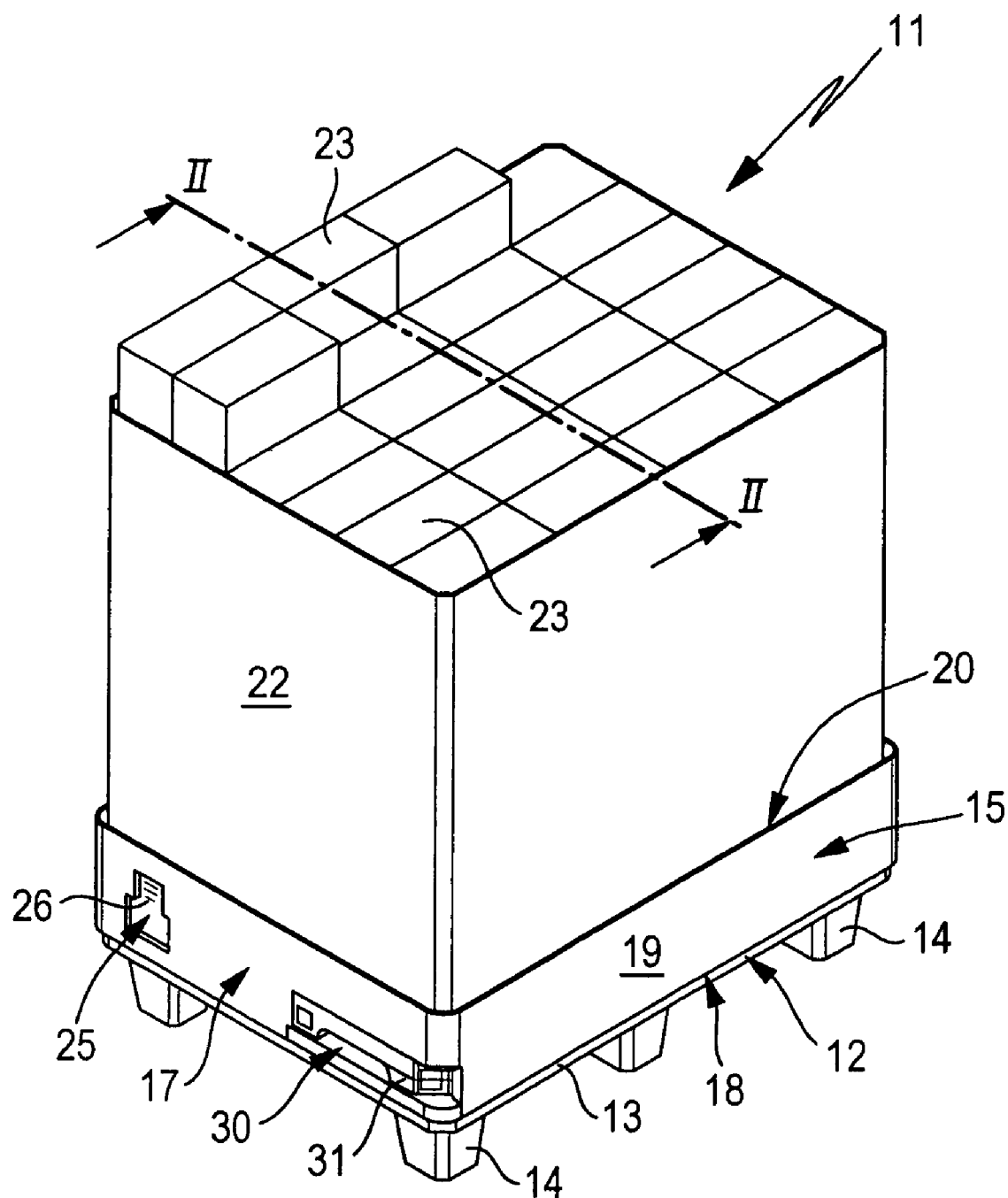
FIG. 1 shows a schematic oblique view of a merchandise presentation arrangement that operates in accordance with the inventive method.
Figure 2:
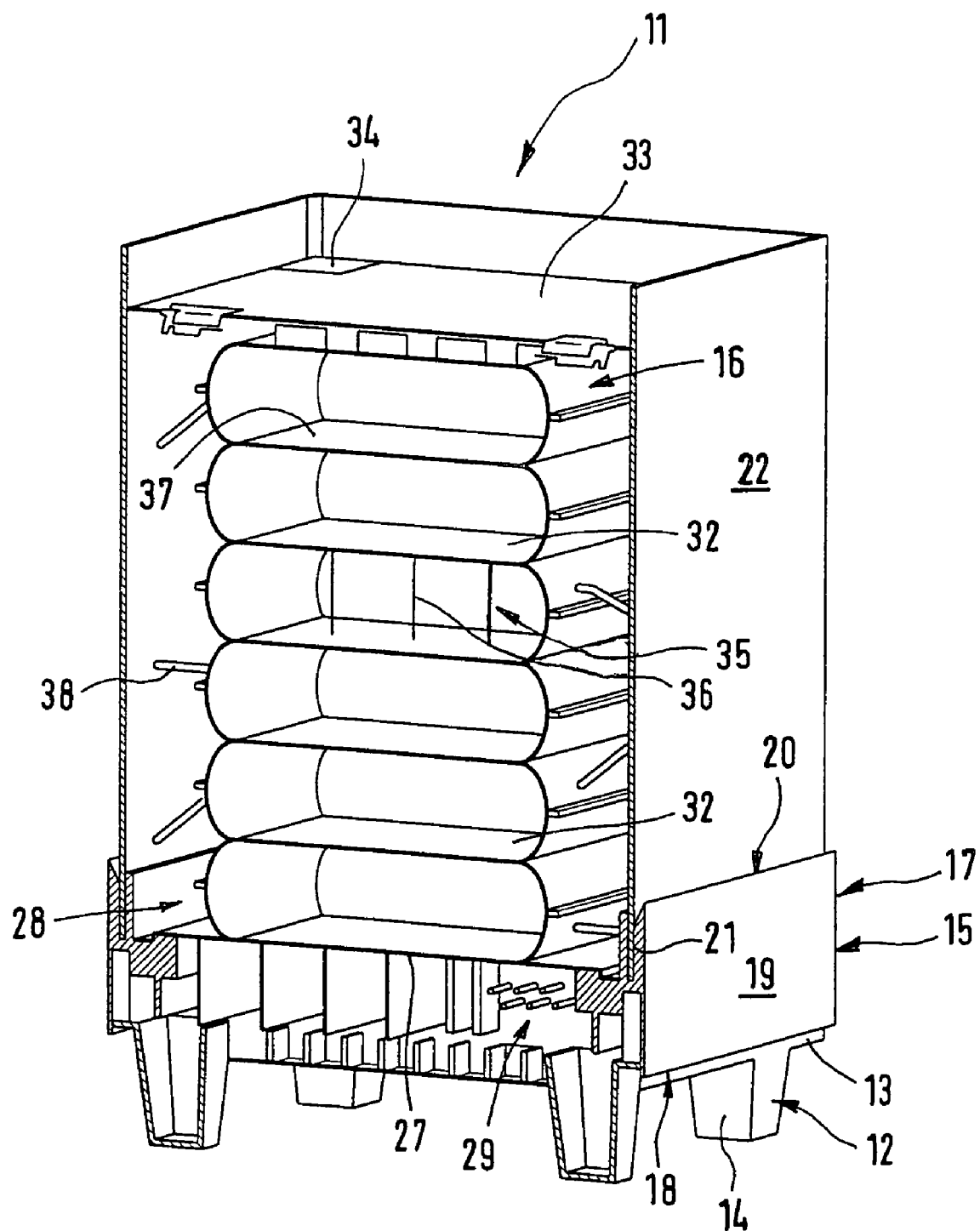
FIG. 2 shows a schematic vertical section through the merchandise presentation arrangement according to FIG. 1 along section line II-II in FIG. 1.

FIGS. 1 and 2 show a merchandise presentation arrangement 11 of modular design that features a support pallet 12 with a base plate 13 and feet 14 that protrude downward from said base plate, as well as a base part 15 that is attached to the base plate 13 and contains a lifting device 16.

The support pallet 12 consists of a customary standard pallet that can be raised by the lifting fork of a fork lift due to its feet 14.

The base part 15 is loosely attached to the support pallet 12 and therefore can be removed at any time. The base part consists, for example, of plastic. The drawings furthermore show that the base part 15 basically has a rectangular shape.

The base part 15 features a frame 17 that is slightly larger than the surface area of the base plate 13 of the support pallet 12 such that the lower edge 18 of the frame 17 overlaps the upper frame edge 20 of the base plate 13 and the base part 15 is laterally fixed on the support pallet 12.

The frame 17 features a frame wall 19 with a slot-like receptacle opening 21 that extends downward from the upper frame edge 20 and serves for inserting side walls 22. The side walls 22 preferably consist of cardboard-like material such that they can be easily disposed when all merchandise 23 situated in the presentation arrangement 11 has been removed.

Figure 4:
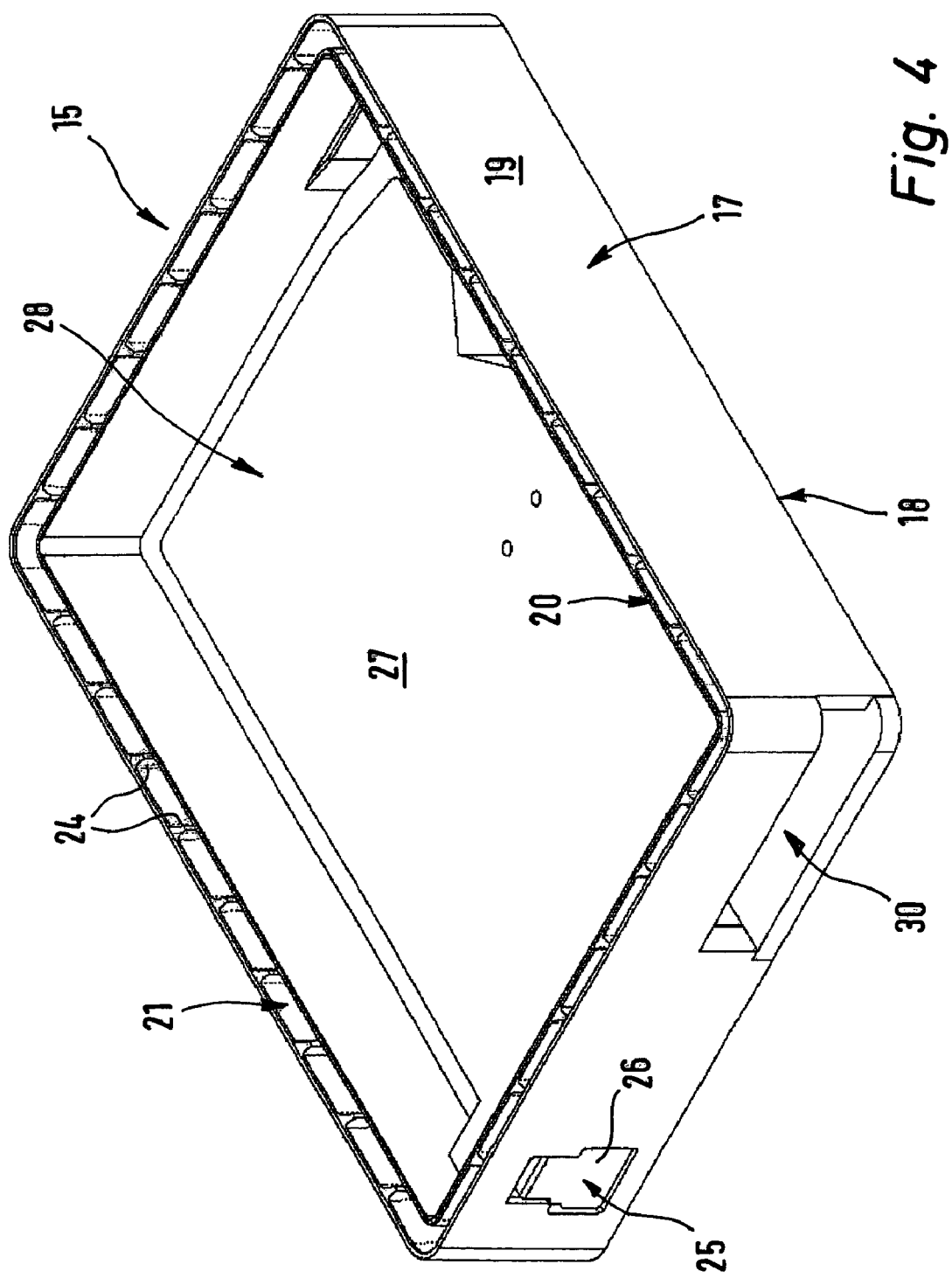
FIG. 4 shows an enlarged oblique view of the base part according to FIG. 3 without a lifting device and drawer module.
Figure 5:
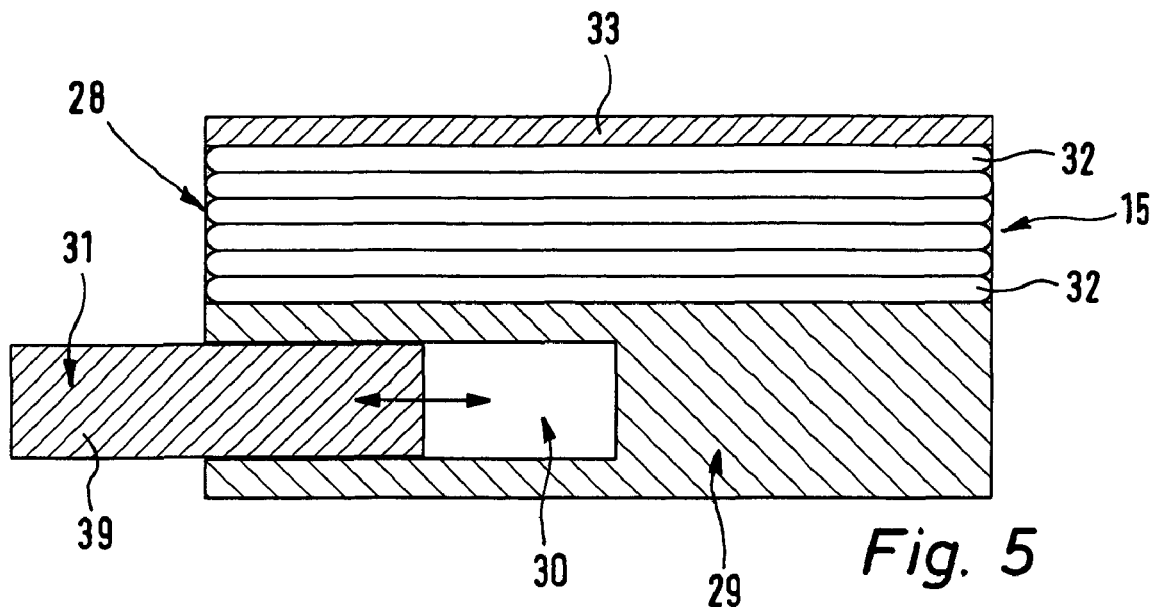
FIG. 5 shows a highly schematic vertical section through the base part according to FIG. 3 along section line V-V in FIG. 3.
Figure 7:
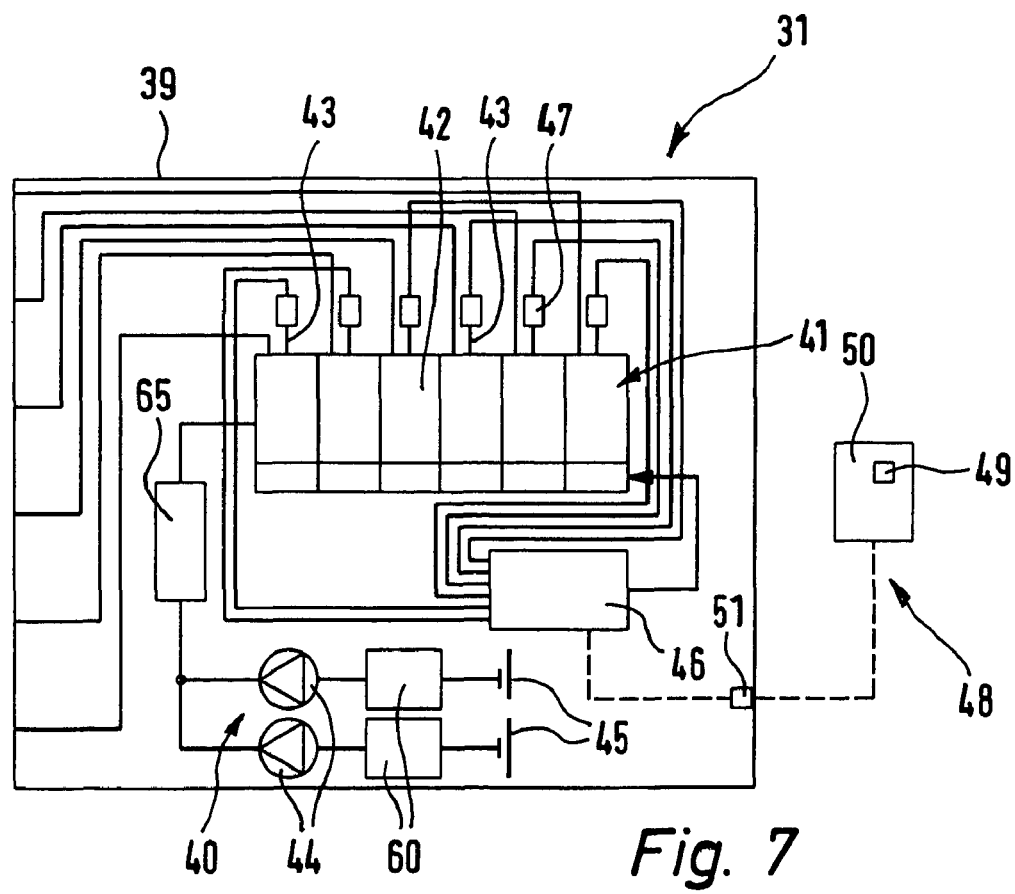
FIG. 7 shows a highly schematic representation of the internal structure of the drawer module according to FIG. 6.
Figure 6:
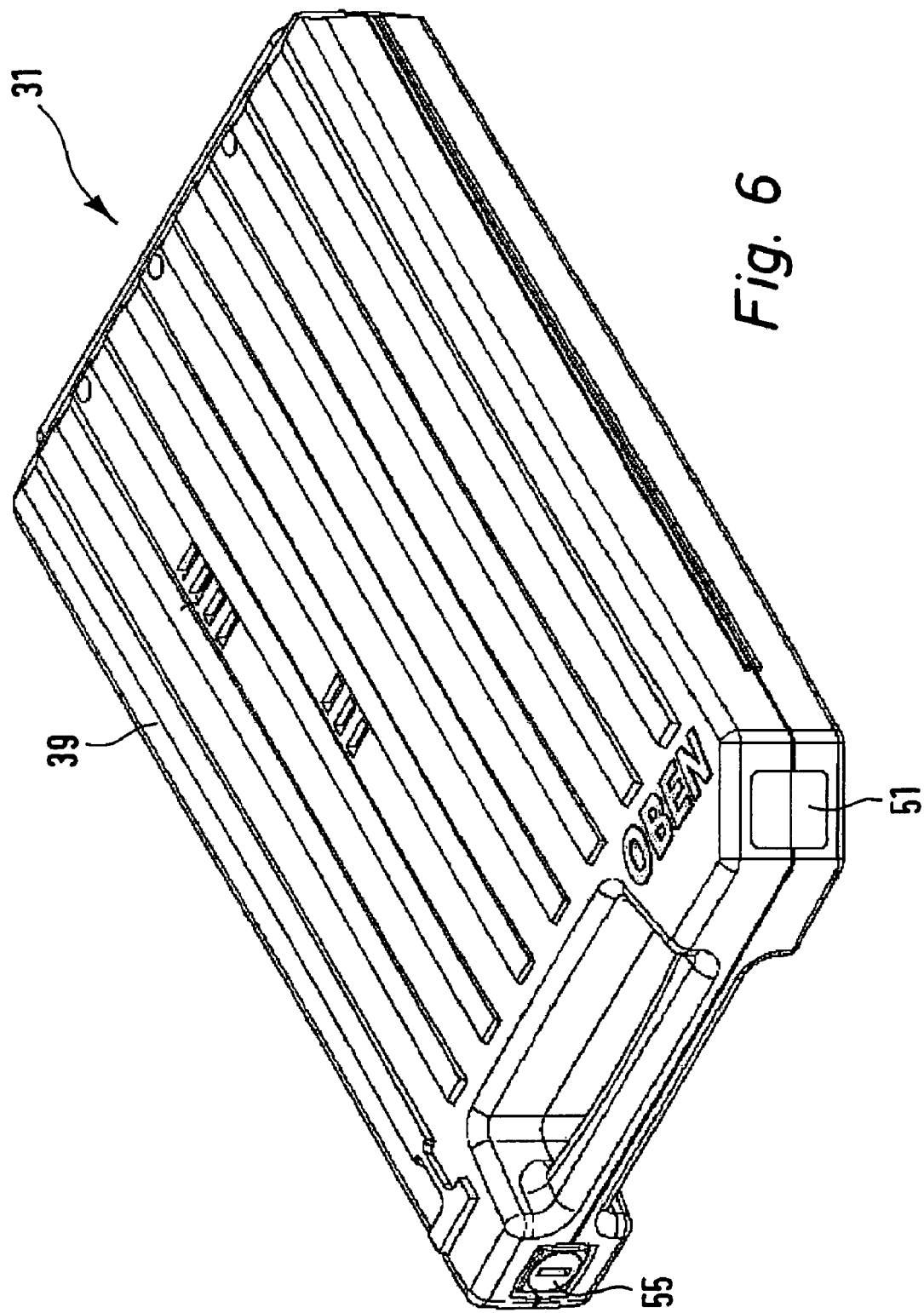
FIG. 6 shows a schematic oblique view of the drawer module to be inserted into the base part.

FIG. 4, in particular, shows that inwardly protruding web-like projections 24 are respectively arranged on the inside of the front and rear walls that define the receptacle opening 21. In this case, the web-like projections on the front wall are arranged opposite the web-like projections on the rear wall. The side walls 22 are subsequently inserted into the region between the opposing projections 24.

Furthermore, a snap-in arrangement 25 is provided for engaging the side walls 22 in the receptacle opening 21. The snap-in arrangement 25 is also situated on the base part 15 and can be operated from outside the base part, for example, by means of an actuating handle 26 arranged in the frame 17 of the base part 15. This actuation causes engagement of the side walls 22 in the receptacle opening 21.

The base part 15 also features an intermediate bottom 27 that divides the base part 15 into an upper part 28 and a lower part 29, wherein the upper part 28 contains the lifting device 16 and the lower part 29 contains a receptacle shaft 30 for accommodating a drawer module 31 that is described in greater detail below.

The aforementioned lifting device 16 features a lifting bottom 33 that serves for depositing the merchandise 23 to be presented in stack layers arranged on top of one another. In FIG. 1, the merchandise 23 is schematically indicated in cuboid form. Four individual pieces of merchandise 23 still remain in the top layer shown. The stack layer situated underneath this top layer is still complete.

Figure 3:
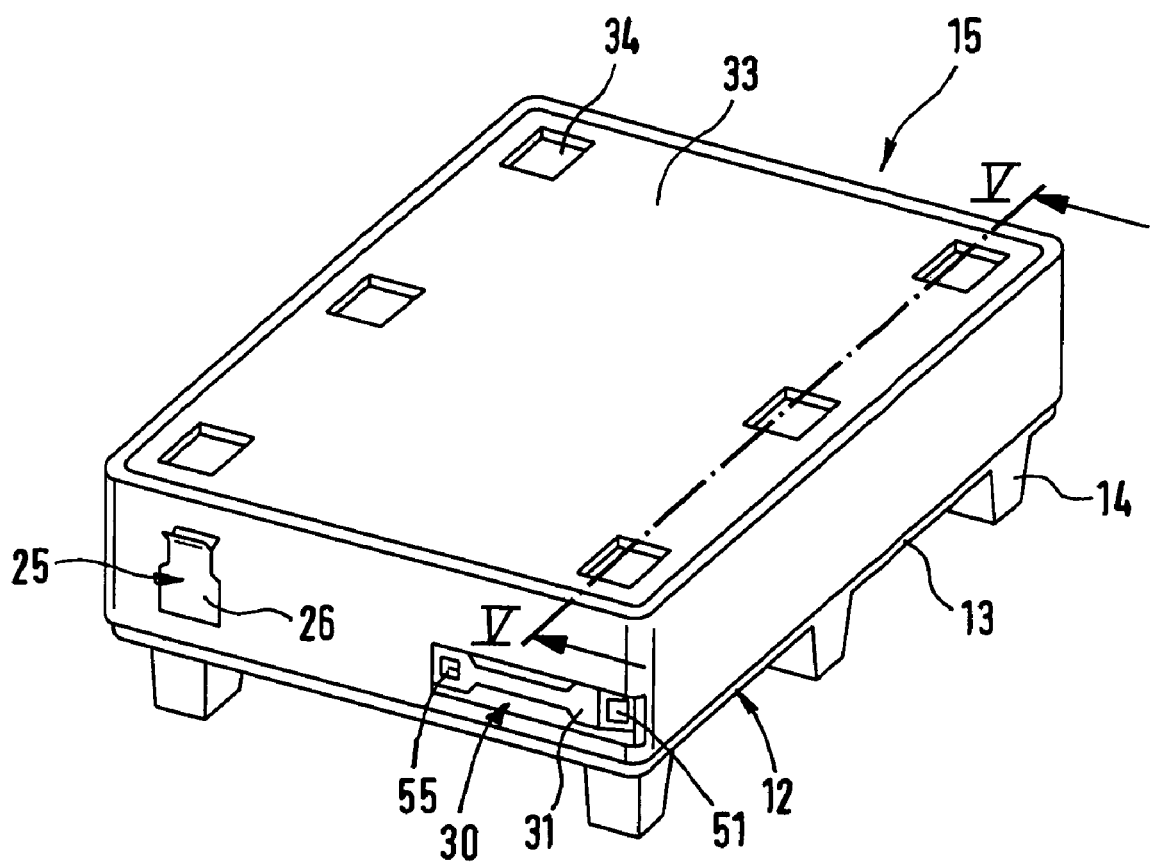
FIG. 3 shows an oblique view of a base part of the merchandise presentation arrangement according to FIGS. 1 and 2 that contains a lifting device.

The lifting device 16 furthermore features a lifting cushion arrangement that carries the lifting bottom 33 and is composed of several lifting cushions 32 that are arranged on top of one another and can be separately filled with a compressed fluid, particularly compressed air. In their idle position, the lifting cushions 32 are deflated such that they respectively have a flatly folded shape and lie on top of one another on the intermediate bottom 27. In this case, the lifting bottom 33 may essentially end flush with the upper edge 20 of the frame 17 (FIG. 3). A compact base part 15 that can be easily handled is created in this fashion.

The upper side of the lifting bottom 33 contains approximately square depressions 34, into which the feet of another support pallet 12 can be inserted in order to stack units that respectively consist of a support pallet 12 and a base part 15 on top of one another.

In FIG. 2, all lifting cushions 32 are illustrated in their functional position, in which they are vertically expanded by means of compressed fluid. It was already mentioned above that the lifting cushions 32 can be filled with compressed fluid independently of one another such that the lifting cushions 32 can be inflated in succession depending on the height of the merchandise in order to respectively raise the lifting bottom 33 accordingly.

The successively used lifting cushions 32 are respectively provided with a lift limiting device 35 that limits the expansion and thusly defines the functional height of the respective lifting cushions 32. In the embodiment shown, the expanded functional height of each lifting cushion 32 corresponds to the vertical dimension of one merchandise stack layer such that the lifting bottom 33 is upwardly displaced by the height of one stack layer during the inflation of one lifting cushion 32.

The lift limiting device 35 may be arranged in the interior of the respective lifting cushion 32 and connect the underside of the respective lifting cushion 32 to its upper side. It may consist, for example, of spacer threads that connect the underside of the cushion to the upper side of the cushion and are only symbolically indicated in one of the lifting cushions 32 in FIG. 2 in order to provide a better overview. This limits the expansion of the lifting cushions such that the upper side and the underside of the respective lifting cushion 32 form support surfaces 37 that are aligned parallel to one another in the functional position. This prevents the lifting bottom 33 from assuming an inclined position that could cause the merchandise arranged thereon to shift during the inflation of the lifting cushions 32.

In order to independently fill the lifting cushions 32, each lifting cushion 32 is provided with a separate compressed fluid hose 38, one end of which leads into the respective lifting cushion 32 via a compressed fluid connection and the other end of which is connected to a compressed fluid outlet 52 on the drawer module 31 in a not-shown fashion.

The drawer module 31 can be inserted into the receptacle shaft 30 on the base part 15 above the feet 14 of the support pallet 12 and exchanged on demand, wherein said drawer module features a module housing 39 and contains the components of a control arrangement 40 for controlling the lifting device 16. In this case, the control arrangement 40 features a valve unit 41 with one respective control valve 42 for each lifting cushion 32, wherein the control valves are respectively assigned to the lifting cushions 32 and control the supply of compressed fluid to the respective lifting cushion 32. A working connection 43 is respectively situated at the outlets of the control valves 42 and is connected to the respective compressed fluid outlet 52 on the module housing 39 via a fluid line that is realized, for example, in the form of a hose.

The control valves 42 may be realized, for example, in the form of piezo-valves.

The compressed fluid in the form of compressed air being delivered to the valve unit 41 is made available by a compressed air generator that contains at least one compressor 44 and may be arranged on the drawer module 31. The at least one compressor 44 may be driven electrically, particularly by means of a respective electric motor 60. The compressors 44 are not directly connected to the valve unit 41, but rather via a pressure accumulator 65 such that the valve unit 41 is supplied with compressed air by the pressure accumulator 65. Furthermore, a power supply unit is provided that contains at least one grid-independent power pack in the form of a storage battery 45 and preferably is also arranged on the drawer module 31. The drawer module 31 is powered in a self-sufficient fashion if the at least one storage battery 45 is arranged on the drawer module 31. However, it may also feature a line terminal that can be connected to the power network.

In addition, a control unit 46 is provided for controlling the valve unit 41 and is preferably also arranged on the drawer module 31. Control commands are transmitted from the control unit 46 to the control valves 42 of the valve unit 41 in order to initiate a switching process of the respective control valves 42.

The control unit 46 is also coupled to pressure sensors 47 that are respectively assigned to one of the lifting cushions 32 and measure the fluid pressure in the respective lifting cushion 32. The pressure sensors 47 may be arranged in the region of the working connections 43 or directly on the working connections 43 of the control valves 42.

As mentioned above, the control arrangement 40 with the control unit 46, the control valves 42 and preferably also the compressed air supply are advantageously arranged on the drawer module 31 that can be inserted into the receptacle shaft 30 and exchanged on demand. In this context, it is also proposed to provide not-shown centering bores on the rear side of the drawer module 31, wherein centering pins arranged in the receptacle shaft 30 can engage into the aforementioned centering bores in order to center the drawer module 31 in the receptacle shaft 30. The drawer module 31 can be locked in the receptacle shaft 30 by means of a locking element 55. The rear side of the drawer module 31 may furthermore contain a not-shown contact switch that detects the correct insertion of the drawer module 31.

In addition, an activation unit 48 is provided for activating the lifting device 16 and is coupled to the control unit 46. The activation unit 48 features an activation switch 49 that is arranged on an external activation module 50. The signal transmission to the control unit 46 is realized in a wireless fashion, particularly via a radio link. Consequently, the activation takes place via remote-control. It is preferred that the lifting devices 16 of several merchandise presentation arrangements 11 can be activated with the activation module 50. The activation unit 48 is also provided with an on/off switch 51 that is preferably arranged on the drawer module 31. The on/off switch 51 can be actuated with the hand or with the foot and changed over between an on-position, in which the lifting device can be activated by means of the activation switch 49, and an off-position, in which this activation is blocked. Consequently, the merchandise presentation arrangement 11 initially needs to be unlocked or "armed" by means of the on/off switch 51 before the lifting device 16 can be activated.

The activation unit does not necessarily have to be arranged separately from the lifting device as in the embodiment shown. It could also be arranged on the drawer module 31, for example, by providing an activation switch instead of an on/off switch 51.

The merchandise presentation arrangement 11 is intended, in particular, for sales outlets, in which the merchandise is received in large quantities and offered to customers without being reloaded into shelves or the like. In such instances, the merchandise presentation arrangement 11 usually is already delivered in a state in which it is completely stocked with merchandise 23. The merchandise 23 is arranged in stack layers that lie on top of one another and are laterally fixed by the side walls 22. The lifting cushions 32 are initially still in their deflated idle position, in which they are arranged on top of one another such that the upper side and the underside of the cushion contact one another. Once the buyers have removed one stack layer of the merchandise 23, they need to reach deeper into the container opening that is enclosed by the side walls 22 in order to obtain the merchandise 23. This inconvenience is avoided with the lifting device 16, in which the lifting cushions 32 are used in succession such that the merchandise that is still situated on the lifting bottom 33 is respectively raised accordingly.

In this context, it is once again expressly noted that the lifting cushions 32 do not necessarily have to be assigned to one respective stack layer of the merchandise only. If the merchandise only has a small height, it may be sufficient to expand one of the lifting cushions 32 after several stack layers have been removed, wherein the functional height of said lifting cushion corresponds to the sum of the heights of the removed stack layers.

Once the last stack layer of merchandise 23 has been removed, all lifting cushions 32 are once again deflated such that the lifting bottom 33 returns into its idle position according to FIG. 3, in which it preferably ends essentially flush with the upper frame edge 20 of the frame 17. The side walls 22 can then be pulled out of the receptacle opening 21 by unlocking the snap-in arrangement 25 and disposed.

According to the present invention, the individual lifting cushions 32 do not have to be individually activated by an operator, but an automatic programs sequence is initiated after the merchandise has been deposited on the lifting bottom 33 and the lifting cushions 32 are automatically inflated in succession once a certain quantity of merchandise, particularly a stack layer, has been removed. This is achieved by programming the control unit 46 accordingly.

This method is described below. In this case, it is assumed for reasons of simplicity that one of the lifting cushions 32 is expanded after the removal of each stack layer of merchandise 23. However, this could also take place differently because the inflation of the individual lifting cushions 32 is dependent on the weight of the remaining merchandise that still acts upon the lifting bottom 33.

Initially, all lifting cushions 32 are deflated. After the activation of the lifting device 16, the control unit 46 switches the control valve 42 assigned to the lifting cushion 32 to be expanded first into its open position such that compressed fluid is supplied to the respective lifting cushion 32 via the assigned compressed fluid hose 38. The compressed fluid is supplied until the fluid pressure in the lifting cushion 32 has increased to a reference pressure value $p_{Ref}$ that essentially corresponds to the total weight of all merchandise. This reference pressure value is reached once an equilibrium of forces is adjusted between the weight of the merchandise and the upwardly directed force generated by the fluid pressure in the lifting cushion. This equilibrium of forces manifests itself in that the lifting cushion 32 begins to expand and the lifting bottom 33 begins to rise accordingly such that the fluid pressure essentially remains constant. This reference pressure value is detected by the control unit 46 that closes the respective control valve 42 such that no more compressed fluid is supplied to the first lifting cushion 32.

The control unit 46 calculates the fluid pressure values or switching pressure values, at which the lifting cushions 32 should be successively inflated, from the reference pressure value. In this case, the expansion of the first lifting cushion 32 should take place at a switching pressure value that corresponds to the total weight of the merchandise minus the weight of the top stack layer. Subsequently, the second lifting cushion 32 to be used next should be expanded at a switching pressure value that corresponds to the total weight of the merchandise minus the weight of the two top stack layers, etc.

The switching pressure value $p_{Schalt}$ of the individual lifting cushions 32 is calculated in accordance with the formula $$P_{Schalt}(n) = \frac{N - n + 1}{N + 1} \cdot P_{Ref}$$

in which N is the total number of lifting cushions and n is the number assigned to the respective lifting cushion 32 in the sequence in which the lifting cushions are used.

In the embodiment shown, six lifting cushions 32 are provided such that the lifting bottom 33 can be respectively raised six times by the functional height of the lifting cushions that is defined by the lift limiting device 35. This corresponds to a load of seven stacked layers of merchandise on the lifting bottom 33 (the top stack layer is removed while all lifting cushions are still deflated).

According to the aforementioned formula, the switching pressure value of the first lifting cushion amounts to $6/7$ of the reference pressure value, the switching pressure value of the second lifting cushion amounts to $5/7$ of the reference pressure value, the switching pressure value of the third lifting cushion amounts to $4/7$ of the reference pressure value, the switching pressure value of the fourth lifting cushion amounts to $3/7$ of the reference pressure value, the switching pressure value of the fifth lifting cushion amounts to $2/7$ of the reference pressure value and the switching pressure value of the sixth lifting cushion amounts to $1/7$ of the reference pressure value.

These switching pressure values are assigned to the individual pressure sensors 47 of each respective lifting cushion 32.

In the stage of the method described so far, the first lifting cushion 32 is acted upon with the reference pressure value required for calculating the switching pressure values, namely without a noteworthy expansion of the lifting cushion. This reference pressure value is higher than the switching pressure value of the first lifting cushion 32. When merchandise is removed, the weight acting from above is reduced. The first lifting cushion 32 yields accordingly such that the fluid pressure in the first lifting cushion 32 is reduced. After the top stack layer of merchandise has been removed, the fluid pressure reaches the switching pressure value of the first lifting cushion 32 and falls below this switching pressure value when the decisive individual merchandise is removed. This is detected by the control unit 46 that compares the actual value of the fluid pressure provided by the corresponding pressure sensor 47 with the switching pressure value and switches over the corresponding control valve 42 such that the supply of compressed fluid to the first lifting cushion 32 is released. This causes the first lifting cushion 32 to expand to its functional height such that the lifting bottom 33 is raised accordingly. The lift limiting device 35 prevents an additional expansion of the lifting cushion such that the fluid pressure in the first lifting cushion 32 increases. This pressure increase is registered by the corresponding pressure sensor 47 and is converted into a switching signal for switching the respective control valve 42 by the control unit 46 such that the supply of compressed fluid is once again interrupted. The next stack layer of merchandise is now situated at a height at which it is comfortably accessible for the buyers.

The correspondingly programmed control unit 46 switches the control valve 42 assigned to the second lifting cushion 32 to be expanded simultaneously, or in a time-delayed fashion, referred to this interruption of the supply of compressed fluid to the first lifting cushion 32, namely such that the supply of compressed fluid to the second lifting cushion 32 is released. Once the fluid pressure in the second lifting cushion 32 has reached its switching pressure value, the supply of compressed fluid to the lifting cushion 32 is interrupted. Analogous to a prior state of the first lifting cushion 32, the second lifting cushion 32 is now, so to say, in a stand-by state for its subsequent expansion.

The switching pressure value of the second lifting cushion 32 is lower than the switching pressure value of the first lifting cushion 32. Consequently, the second lifting cushion 32 remains in this stand-by state until the fluid pressure therein falls below the switching pressure value of the second lifting cushion 32 due to the removal of merchandise. At this time, the control valve 42 assigned to the second lifting cushion 32 is once again switched over such that the supply of compressed fluid is released and the second lifting cushion 32 is expanded until the supply of compressed fluid is once again interrupted when the second lifting cushion 32 reaches its functional height, wherein the third lifting cushion 32 is acted upon with compressed fluid simultaneously or in a time-delayed fashion until its switching pressure value is reached.

This sequence continues accordingly up to the last lifting cushion 32.

A single lifting cushion suffices if the lifting device is only loaded with two stack layers of merchandise. The described process sequence ends correspondingly earlier in this case.

Once all merchandise has been removed from the lifting device, all lifting cushions 32 can be deflated again.

In order to compensate leaks that could cause the fluid pressure in the respective lifting cushion 32 to drop below its switching pressure value, it is proposed that the supply of compressed fluid be released in a cyclic fashion when the fluid pressure reaches a lower pressure threshold below the switching pressure value and interrupted when the fluid pressure increases to an upper pressure threshold that lies near the switching pressure value.

The fluid pressure required for expanding the last expanded respective lifting cushion 32 that corresponds to its switching pressure value is lower than the fluid pressure in the previously expanded lifting cushion or the previously expanded lifting cushions 32. It is therefore useful that, after expanding a lifting cushion 32 to its functional height, the fluid pressure in the previously expanded lifting cushion or the previously expanded lifting cushions be lowered or reduced via leaks, namely to the fluid pressure in the last lifting cushion 32 expanded.

The lifting cushions 32 provided may, in principle, be inflated in any sequence. However, it is advantageously proposed that the lifting cushions 32 be sequentially used from the top to the bottom such that the top lifting cushion 32 situated adjacent to the lifting bottom 33 is used as the first lifting cushion, the lifting cushion 32 situated underneath the top lifting cushion is used as the second lifting cushion, etc.

The invention claimed is:

1. A method for operating a merchandise presentation arrangement that features a lifting device with a lifting bottom for depositing merchandise in stack layers arranged on top of one another, as well as a lifting cushion arrangement that carries the lifting bottom and comprises one or more lifting cushions that are arranged on top of one another and can be individually filled with a compressed fluid, particularly compressed air, wherein the lifting cushions can be expanded up to a functional height limited by a lift limiting device by supplying compressed fluid and used in succession if several lifting cushions are provided, wherein each lifting cushion is assigned a separate control valve that controls the supply of compressed fluid to the respective lifting cushion, as well as a separate pressure sensor that measures the fluid pressure in the respective lifting cushion, and wherein a control unit is provided connected to the at least one pressure sensor and switches the control valves, and wherein, after depositing the merchandise and activating the lifting device, compressed fluid is supplied to a lifting cushion or one of the lifting cushions in an automatic program sequence until the fluid pressure increases to a reference pressure value $p_{Ref}$ that essentially corresponds to the total weight of the merchandise, and the lifting cushion begins to expand with an essentially constant reference pressure value, whereupon the supply of compressed fluid is interrupted, and wherein the control unit recalculates the reference pressure value for each lifting cushion into a switching pressure value $p_{Schalt}$ that is assigned to the respective pressure sensor in accordance with the formula $$P_{Schalt}(n) = \frac{N-n+1}{N+1} \cdot P_{Ref}$$

in which N is the total number of lifting cushions and n is the number assigned to the respective lifting cushion in the sequence in which the lifting cushions are used, and wherein the supply of compressed fluid to the respective lifting cushion is released when the fluid pressure in the one lifting cushion or the first of several lifting cushions falls below the switching pressure value assigned to the lifting cushion due to the removal of merchandise such that the lifting cushion expands up to its functional height, whereupon the increase in the fluid pressure in the lifting cushion is used as a switching signal for interrupting the supply of compressed fluid to the one lifting cushion or the first of several lifting cushions, and wherein, if several lifting cushions are provided, the supply of compressed fluid to the respectively next lifting cushion is released simultaneously or in a time-delayed fashion referred to the interruption of the supply of compressed fluid to a lifting cushion that was expanded up to its functional height, wherein the supply of compressed fluid to the next lifting cushion is interrupted after at least its switching pressure value is reached and is subsequently released again in order to expand the lifting cushion up to its functional height once the fluid pressure falls below the switching pressure value due to the removal of merchandise.

2. The method according to claim 1, wherein the supply of compressed fluid is released in a cyclic fashion when the fluid pressure reaches a lower pressure threshold below the switching pressure value in order to compensate leaks that cause the fluid pressure in the respective lifting cushion to drop below its switching pressure value, wherein the supply of compressed fluid is interrupted when the fluid pressure increases an upper pressure threshold that lies near the switching pressure value.

3. The method according to claim 1, wherein, after expanding a lifting cushion to its functional height, the fluid pressure in the previously expanded lifting cushion or the previously expanded lifting cushions is lowered or reduced via leaks to the fluid pressure in the last lifting cushion expanded.

4. The method according to claim 1, wherein the lifting cushions are sequentially used from the top to the bottom such that the top lifting cushion situated adjacent to the lifting bottom is used as the first lifting cushion, the lifting cushion situated underneath the top lifting cushion is used as the second lifting cushion, etc.

5. A lifting device for a merchandise presentation arrangement in order to carry out the method according to claim 1.

6. The method according to claim 2, wherein, after expanding a lifting cushion to its functional height, the fluid pressure in the previously expanded lifting cushion or the previously expanded lifting cushions is lowered or reduced via leaks to the fluid pressure in the last lifting cushion expanded.

7. The method according to claim 2, wherein the lifting cushions are sequentially used from the top to the bottom such that the top lifting cushion situated adjacent to the lifting bottom is used as the first lifting cushion, the lifting cushion situated underneath the top lifting cushion is used as the second lifting cushion, etc.

8. A lifting device for a merchandise presentation arrangement in order to carry out the method according to claim 2.

9. The method according to claim 3, wherein the lifting cushions are sequentially used from the top to the bottom such that the top lifting cushion situated adjacent to the lifting bottom is used as the first lifting cushion, the lifting cushion situated underneath the top lifting cushion is used as the second lifting cushion, etc.

10. A lifting device for a merchandise presentation arrangement in order to carry out the method according to claim 3.

11. A lifting device for a merchandise presentation arrangement in order to carry out the method according to claim 4.

* * * * *